UNITED STATES PATENT OFFICE.

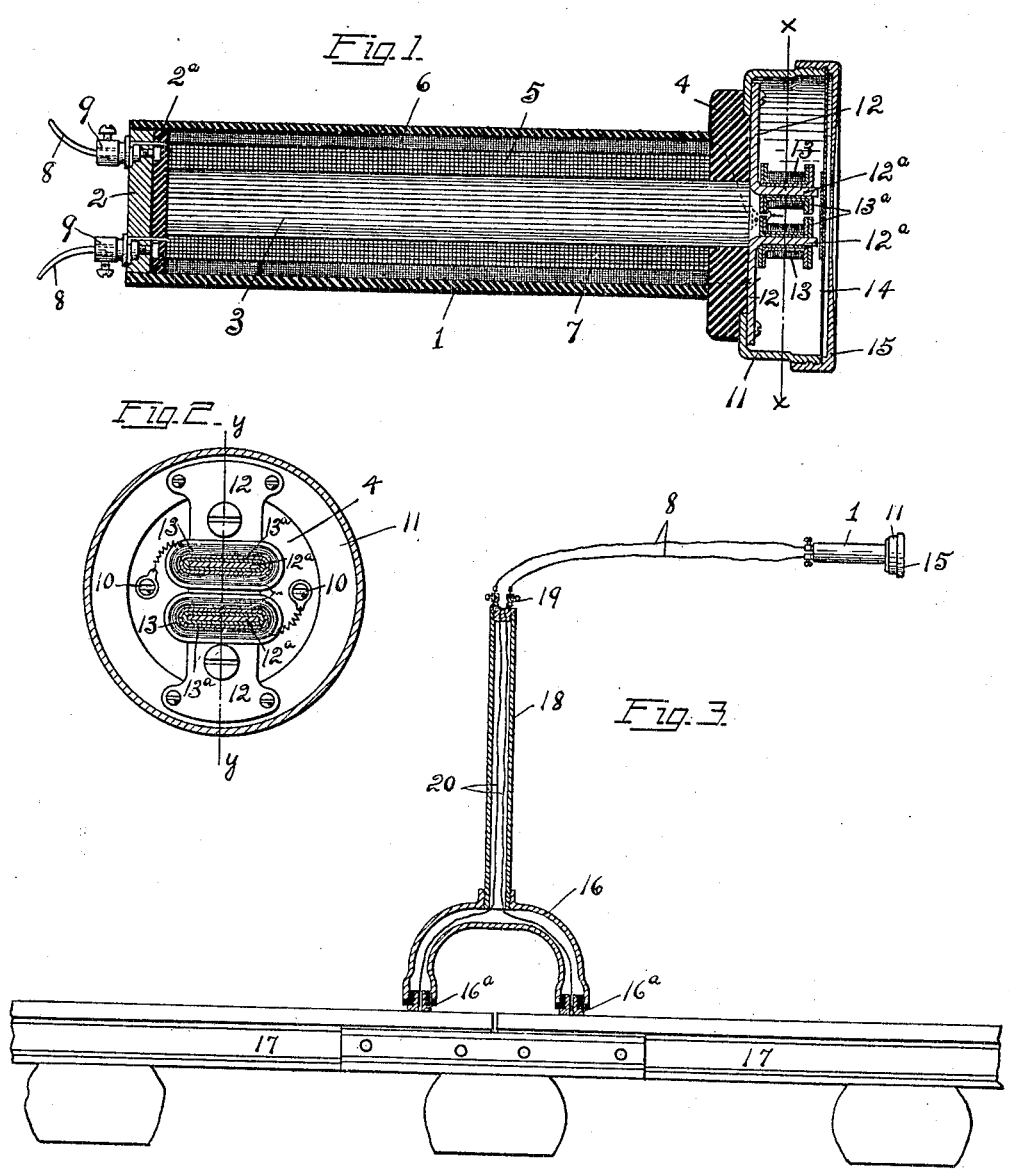

HARRIS A. WATSON, OF SYLVANIA, OHIO.

RECEIVING DEVICE FOR BOND-DETECTORS.

No. 837,440.  Specification of Letters Patent.  Patented Dec. 4, 1906.

Application filed April 13, 1905. Serial No. 255,363.

*To all whom it may concern:*

Be it known that I, HARRIS A. WATSON, a citizen of the United States, and a resident of Sylvania, in the county of Lucas and State of Ohio, have invented certain new and useful Improvements in Receiving Devices for Bond-Detectors; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to instruments for detecting and examining the condition of the connecting-bonds of rails on electric railroads and the like, and has for its object the provision of a device of this class that is extremely sensitive in its nature and adapted to convey to the operator sounds varying in strength as the bond is more or less defective.

The invention is fully described in the following specification and shown in the accompanying drawings, in which—

Figure 1 is a central longitudinal section of the instrument embodying my invention, taken on the dotted line $y\,y$ in Fig. 2. Fig. 2 is a cross-section of the same, taken on the dotted line $x\,x$ in Fig. 1; and Fig. 3 is a side elevation of two bonded rails with the contact piece or foot to which the detector is connected bridging the joint of the rails and shown in longitudinal section.

Referring to the drawings, 1 represents a cylindrical casing of any suitable insulating material, the outer end of which casing is closed, as shown at 2. Mounted centrally within the casing 1 is a soft-iron core 3, which has its inner end secured to the disk $2^a$ and its outer end passed through an aperture provided centrally in the larger disk 4, which disks are made of insulating material and form the ends of a spool of which the core acts as the shank. Around the core 3 are the two windings 5 and 6, forming the primary and secondary coils, respectively, of an induction-coil, the two windings being separated from each other by an insulating-strip 7 and the coil 6 being of finer wire than the coil 5. The primary coil 5 has its two terminals or poles passed through the end of the casing and connected with the line-wires 8 through the binding-posts 9, which latter are secured to the casing end. The terminals of the secondary coil 6 pass from the opposite end of the spool through the disk 4 and connect with the separate binding-screws 10 in said disk.

Mounted on the outer face of the disk 4 is a cylindrical shell 11, diametrically of which and directly over the exposed end of the core 3 is secured the permanent magnet 12, the poles $12^a$ of which are brought close together in the center of the shell and bent outwardly in parallel relation. A fine coil of wire 13 is wound upon a spool $13^a$ on each pole $12^a$ and have two of their terminals connected with the two terminals of the secondary coil 6 through the binding-screws 10, as shown in Fig. 2, thus closing the circuit between the secondary coil 6 and coils 13. A thin diaphragm 14, of suitable material to be attracted by the poles of the magnet 12, is placed over the open end of the shell 11 in close position to the ends of the poles $12^a$ and secured in place by a centrally-apertured cap or cover 15, which is threaded to the rim of said shell.

The line-wires 8 have connection with a hollow joint-bridging member 16, which is provided at its ends with the insulated contact-pieces $16^a$ for contact with the two rails 17. A hollow upright 18 may be secured to the upper portion of the bridging member for elevating the line-wires 8 to the desired height. The line-wires 8 connect with the binding-posts 19 at the upper end of the upright and communicate with the contact-pieces $16^a$ or poles of the member 10 through the wires 20, which pass down through the upright 18 and bridge member 16.

The operation of my invention is as follows: In detecting the condition of a bond the joint of two connecting-rails is bridged over by the member 16, the contact-pieces $16^a$ being placed in contact therewith. Should the bond-wire be even slightly defective, a portion of the current passing along the rails would be taken up by the contact-pieces $16^a$ and caused to pass through the detecting instrument. The passing of the current through the primary coil 5 converts the core 3 into an electromagnet, which acts directly upon the permanent magnet 12 and induces a current in the secondary coil 6, which current is communicated to the fine coils 13, and thereby greatly strengthens the magnetic effect of the poles of the magnet 12. Should the bond be only slightly defective, the electromagnet is not sufficiently energized to susceptibly affect the strength of the magnet 12, said magnet being principally strengthened by the induced current passing through the coils 6 and 13, which causes a vibration or undulation of the diaphragm and a consequent sound to be emitted from the instrument. Should the bond be quite badly defective, the permanent magnet is acted on both by the electromagnet and the induced current, thereby causing a much louder sound to be emitted from the instrument, the sound increasing or diminishing in strength as the bond is more or less defective.

I am aware that an ordinary telephone-receiver may be used for detecting a defective bond; but I have found by experimenting that by the use of such instrument a slight defect cannot be detected, nor can the operator tell by its use to what degree the bond is defective. By constructing the instrument in the manner described and shown the operator can not only detect a very slight defect in the bond, but can also tell by the nature of the sound emitted by the vibrations of the diaphragm to what extent the bond is defective.

Having thus described my invention, what I claim as new, and desire to secure by Letters Patent, is—

1. In combination, a shell, a diaphragm mounted therein, a polarized magnet also mounted in the shell with the diaphragm on one side thereof and an induction-coil located on the opposite side of said magnet from the diaphragm, in axial alinement with the shell and to the exterior thereof, circuit connection between the secondary coil of said induction-coil and the coil of the polarized magnet, and circuit connection between the primary coil and the line-wires.

2. In combination, a shell, a diaphragm mounted therein, a polarized magnet housed within the shell and an induction-coil located on the same side of the diaphragm as said magnet and without the shell with its core so disposed as to influence the polarized magnet, circuit connection from the secondary winding of the induction-coil to the winding of the polarized magnet, and circuit connections between the primary windings of the induction-coil and the line-wires.

3. In combination, a diaphragm, an induction-coil disposed axially in relation thereto having a soft-iron core with its end, adjacent the diaphragm, exposed, a magnet located between said end and the diaphragm and designed to be influenced by said core, a helix-winding about the said magnet, circuit connections between the same and the secondary windings of the induction-coil and circuit connections between the primary windings and the line-wires.

4. A receiver comprising a diaphragm, an induction-coil and magnets interposed between one end of the core of said coil and the diaphragm, exposed to said end and having poles closely adjacent and extending in a direction axially of the core helix-windings about said magnets in circuit with each other, circuit connection between said windings and the secondary windings of the induction-coil and circuit connection between the primary windings of the induction-coil and the line-wires.

5. A receiver comprising an induction-coil having a core projecting at one end through the windings thereof, an insulated block providing one end for the coil and having an axial opening to receive the end of the core and through which the same is exposed, a shell mounted on the block, a diaphragm mounted in the shell, magnets including two plates extending diametrically of the shell directly over the exposed end of the core and having their adjacent ends in alinement with the core deflected to extend in a direction parallel with the axis of said core and diaphram field-windings on said deflected ends, circuit connection between said windings and the secondary winding of the induction-coil, and circuit connection between the primary windings of the induction-coil and the line-wires.

In witness whereof I have hereunto signed my name to this specification in the presence of two subscribing witnesses.

HARRIS A. WATSON.

Witnesses:
CORNELL SCHREIBER,
C. W. OWEN.